2,863,838
Patented Dec. 9, 1958

United States Patent Office 2,863,838

PRODUCTION OF CATALYSTS CONTAINING VANADIUM

George Clarkson Vincent, Norton-on-Tees, England, assignor to Imperial Chemical Industries Limited, London, England, a corporation of Great Britain No Drawing. Application August 8, 1955
Serial No. 527,119

Claims priority, application Great Britain August 25, 1954

6 Claims. (Cl. 252—432)

This invention relates to the production of catalysts containing vanadium.

Vanadium containing catalysts are used in the oxidation of sulphur dioxide to sulphur trioxide. The known methods for the preparation of such catalysts involve operations such as precipitation of gels, filtration, washing, drying and calcining. Catalysts produced by such operations, which involve the repeated handling of large volumes of liquid, precipitate and powder are costly.

It is known to prepare skeletal glasses i. e. glasses possessing a porous or skeletal structure, by heating a glass of suitable composition to cause phase separation and then extracting a soluble phase. Such a process when applied to the production of skeletal glass catalysts is, in general, less costly than conventional methods, involving a precipitation process, for the preparation of catalysts.

It is an object of the present invention to provide a process for the production of a skeletal glass catalyst containing vanadium particularly suitable for use in the oxidation of sulphur dioxide to sulphur trioxide. It is a further object to provide a skeletal catalyst containing vanadium which has good catalytic activity and satisfactory mechanical strength.

According to the present invention therefore there is provided a process for the production of a skeletal glass catalyst containing vanadium which comprises the steps of fusing a mixture containing vanadium, silica, boric oxide and an alkali metal to produce a glass, subjecting the glass to a temperature sufficient to cause separation of phases at least one of which is soluble in an extraction medium and extracting at least part of at least one soluble phase to produce the desired skeletal structure.

It is preferred that the mixture from which the glass is produced should have a composition within the following limits:

Vanadium as $V_2O_5$_____ Up to 10%.
Silica_____ 30 to 60%.
Boric oxide_____ 10 to 50%.
Alkali metal according to the ratio
  $Me_2O/V_2O_5$ _____ 1.5/1 to 3/1.

It is preferred not to deviate too greatly from the above limits of composition to ensure that phase separation occurs on heating the glass formed by fusing the mixture, to ensure that it is possible to extract preferentially one phase and to ensure that the final skeletal structure has satisfactory mechanical strength.

The vanadium may be introduced into the mixture in the form of a variety of compounds for example, vanadium pentoxide, vanadyl sulphate and vanadyl chloride. It is preferred to use vanadium pentoxide.

The alkali metal may be introduced into the mixture in the form of a variety of compounds, for example, as an oxide, carbonate, bicarbonate, sulphate, bisulphate, or nitrate. The vanadates, borates and silicates may also be used and in this case part at least of the required vanadium, boric oxide or silica is introduced as an alkali metal salt. Mixtures of alkali metal compounds may be used. A very suitable mixture contains potassium carbonate and potassium sulphate.

The glass may be formed by any of the known methods of the glass industry, into shapes of the desired size, for example spheres of say, ¼ to ½ inch diameter, or rods of say, $\tfrac{3}{16}$ inch diameter and ¼ to $\tfrac{3}{16}$ inch length. Alternatively, the glass after solidification, may be broken up into roughly shaped pieces preferably of such a size that they pass a $\tfrac{3}{16}$ inch mesh sieve and are retained by a ⅛ inch mesh sieve.

The shaped glass is subjected to a temperature sufficient to cause separation of the glass into intermingled phases, at least one of which is soluble in an extraction medium. The temperature employed depends upon the composition of the glass but we have found that the separation of phases is usually sufficiently complete after maintaining a temperature of 400° to 700° C. for 24 hours. Melting the glass destroys the phase separation and therefore any process for forming the glass into desired shapes which involves melting the glass should be carried out prior to phase separation. On the other hand processes for the reduction of the mass of glass into smaller pieces which do not involve melting the glass, for example, breaking the glass mechanically, may be carried out subsequent to the phase separation process.

After the glass has been heated to effect separation of phases it is then subjected to an extraction process whereby at least one soluble phase is partially or completely extracted. A variety of extraction media may be used, the choice of a particular medium depending on a number of factors, for example, the composition of the glass and the degree of extraction required. Suitable extraction media are caustic alkalis such as caustic soda and strong acids such as hydrochloric, sulphuric and nitric acids. Boiling dilute hydrochloric acid is a very convenient extraction medium.

In order to ensure that the final skeletal catalyst has been mechanical strength it is preferable to use a buffered acid or alkaline extraction medium. A very suitable buffered extraction medium is dilute caustic soda solution buffered with potassium dihydrogen phosphate. The period that is necessary for the glass to remain in contact with the extraction medium to obtain a given degree of extraction depends on the composition of the glass, on the concentration of the extraction medium and to a limited extent on the particular extraction medium used.

Example 1

5 parts vanadium pentoxide, 5 parts potassium sulphate, 15 parts potassium carbonate, 40 parts silica and 35 parts boric oxide were thoroughly mixed and fused at 1300° C. for 2 hours. The glass produced was then broken up into small pieces which were heated at 500° C. for 60 hours to cause phase separation and after cooling, immersed for 2 hours in a boiling aqueous caustic soda solution buffered to pH 8 with potassium dihydrogen phosphate. The pieces of glass were then washed with water and dried. The original glass was found to have decreased in weight by 22.5%.

The skeletal glass catalyst thus produced was mechanically strong, glassy in appearance and had a surface area of 36.2 square metres per gram.

Example 2

5 parts vanadium pentoxide, 40 parts silica, 5 parts potassium sulphate, 10 parts potassium carbonate and 40 parts boric oxide, were thoroughly mixed and fused at 1300° C. for 2 hours to give a glass having the following composition:

| | Percent |
|---|---|
| Vanadium as $V_2O_5$ | 4.4 |
| Silica | 42.4 |
| Potassium as $K_2O$ | 9.2 |
| Boric oxide | 41.8 |
| Sulphur trioxide | 0.3 |

The fused glass was poured on to a flat metal plate and after it had solidified it was broken up into small pieces substantially all of which were retained on a ⅛ inch mesh sieve and passed a ¼ inch mesh sieve. These pieces of glass were then heated at 500° C. for 24 hours to cause phase separation and after cooling, immersed in boiling N/2 hydrochloric acid for ½ hour to extract the soluble phase, washed with water and dried. It was found that the glass had decreased in weight by about 30%.

The composition of the final skeletal catalyst was:

| | Percent |
|---|---|
| $V_2O_5$ | 5.5 |
| $K_2O$ | 3.6 |
| $SiO_2$ | 62.1 |
| $B_2O_3$ | 20.8 |
| $SO_3$ | 0.5 |

Its activity was tested in the oxidation of sulphur dioxide to sulphur trioxide as follows:

A mixture of sulphur dioxide and air containing 6% by volume of sulphur dioxide was passed over the catalyst maintained at a temperature of 472° C. at a space velocity of 3130 litres per litre of catalyst per hour. The conversion expressed as moles sulphur trioxide produced per 100 moles sulphur dioxide processed was 95.7 compared with a conversion of 86.5 when using a standard extruded vanadium catalyst.

I claim:

1. A process for the production of a skeletal glass catalyst containing as an essential constituent vanadium which comprises the steps of fusing a mixture containing up to 10% vanadium as vanadium pentoxide, 30 to 60% silica, 10 to 50% boric oxide and alkali metal equivalent to an alkali metal oxide $Me_2O$/vanadium pentoxide ratio of 1.5:1 to 3:1 to produce a glass, subjecting the glass to a temperature within the range 400 to 700° C. to cause separation of phases at least one of which is soluble in an extraction medium selected from the group consisting of caustic alkalies and mineral acids and extracting at least part of at least one soluble phase.

2. The process of claim 1, wherein said medium comprises a buffered solution.

3. The process of claim 1, wherein said skeletal glass catalyst contains 5.5% vanadium pentoxide.

4. A process for the production of a skeletal glass catalyst containing as an essential constituent vanadium which comprises the steps of fusing a mixture containing up to 10% vanadium as vanadium pentoxide, 30 to 60% silica, 10 to 50% boric oxide and alkali metal equivalent to an alkali metal oxide $Me_2O$/vanadium pentoxide ratio of 1.5:1 to 3:1 to produce a glass, subjecting the glass to a temperature within the range 400 to 700° C. to cause separation of phases at least one of which is soluble in an extraction medium and extracting at least part of at least one soluble phase with boiling dilute hydrochloric acid.

5. A process for the production of a skeletal glass catalyst containing as an essential constituent vanadium which comprises the steps of fusing a mixture containing up to 10% vanadium as vanadium pentoxide, 30 to 60% silica, 10 to 50% boric oxide and alkali metal equivalent to an alkali metal oxide $Me_2O$/vanadium pentoxide ratio of 1.5:1 to 3:1 to produce a glass, subjecting the glass to a temperature within the range 400 to 700° C. to cause separation of phases at least one of which is soluble in an extraction medium and extracting at least part of at least one soluble phase with a buffered solution of caustic soda.

6. A process for the production of a skeletal glass catalyst containing as an essential constituent vanadium which comprises the steps of fusing a mixture containing up to 10% vanadium as vanadium pentoxide, 30 to 60% silica, 10 to 50% boric oxide and alkali metal equivalent to an alkali metal oxide $Me_2O$/vanadium pentoxide ratio of 1.5:1 to 3:1 to produce a glass, subjecting the glass to a temperature within the range 400 to 700° C. to cause separation of phases at least one of which is soluble in an extraction medium selected from the group consisting of caustic alkalies and mineral acids and extractng at least part of at least one soluble phase, whereby the weight of said glass is decreased by an amount up to 30%.

References Cited in the file of this patent

UNITED STATES PATENTS

| 2,068,801 | Hood | Jan. 26, 1937 |
| 2,315,329 | Hood et al. | Mar. 30, 1943 |
| 2,500,092 | Parker | Mar. 7, 1950 |
| 2,500,801 | Church | Mar. 14, 1950 |
| 2,504,001 | Connolly | Apr. 11, 1950 |
| 2,515,943 | Stookey | July 18, 1950 |